(12) United States Patent
Slocum et al.

(10) Patent No.: US 9,889,946 B2
(45) Date of Patent: Feb. 13, 2018

(54) ELECTRONIC CHECKLISTS WITH DYNAMIC VISIBILITY OF ANNOTATIONS

(71) Applicant: Gulfstream Aerospace Corporation, Savannah, GA (US)

(72) Inventors: Ray Slocum, Savannah, GA (US); Nicholas Kershaw, Savannah, GA (US); Jeffrey Hausmann, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/082,206

(22) Filed: Mar. 28, 2016

(65) Prior Publication Data

US 2017/0275017 A1 Sep. 28, 2017

(51) Int. Cl.
*B64D 43/00* (2006.01)
*G06F 3/0482* (2013.01)
*G06F 17/24* (2006.01)

(52) U.S. Cl.
CPC ........... *B64D 43/00* (2013.01); *G06F 3/0482* (2013.01); *G06F 17/241* (2013.01)

(58) Field of Classification Search
CPC .. A61B 2034/252; B64D 43/00; B64D 43/02; B64D 45/00; G06F 3/048; G06F 3/0482; G06F 3/04886; G06F 17/241

USPC .................................................. 340/945–983
See application file for complete search history.

(56) References Cited

U.S. PATENT DOCUMENTS

| 6,262,720 | B1 | 7/2001 | Jeffrey et al. | |
|---|---|---|---|---|
| 6,753,891 | B1 | 6/2004 | Chohan et al. | |
| 8,736,464 | B1 * | 5/2014 | Downs Mullen | G01C 23/00 340/521 |
| 2006/0028012 | A1 * | 2/2006 | Holder | B42D 1/009 283/66.1 |
| 2008/0140266 | A1 * | 6/2008 | Stefani | G08G 5/0034 701/3 |
| 2012/0209468 | A1 * | 8/2012 | Thomas | G07C 5/006 701/29.1 |

* cited by examiner

*Primary Examiner* — Brian Wilson
(74) *Attorney, Agent, or Firm* — LK Global | Lorenz & Kopf, LLP

(57) ABSTRACT

Display systems, controllers, and methods are provided. A display system for an aircraft includes a display unit, an input device, and a controller. The controller is communicatively coupled with the display and the input device and is configured to retrieve an electronic checklist that includes a plurality of tasks including an annotated task associated with at least one of a note, a warning, a caution, and task information. The controller is further configured to hide from view the at least one of the note, the warning, the caution, and the task information in an image of the electronic checklist based at least in part on viewing criteria. The controller is further configured to generate a signal that causes the display unit to visually present the image.

17 Claims, 7 Drawing Sheets

ELECTRONIC CHECKLISTS WITH DYNAMIC VISIBILITY OF ANNOTATIONS

TECHNICAL FIELD

The technical field relates generally to systems and methods for presenting electronic checklists, and more particularly relates to systems and methods for hiding annotations of inactive steps in electronic checklists.

BACKGROUND

In aviation, pilots have traditionally utilized paper-based checklists in the operation of aircraft. These conventional checklists include annotations that give further information, warnings, or cautions about the procedure to the pilots. Such information, warnings, and cautions provide valuable information that may be useful during performance of tasks on the checklist. Conventional electronic checklists have maintained the format of the paper-based checklists. Although the information, warnings, and cautions are valuable for the pilots, they increase visual clutter because all of the information is typically visible within the checklist.

As such, it is desirable to provide display systems, controllers, and methods for presenting electronic checklists with reduced visual clutter to focus crew attention on the information pertinent to the current place in the procedure. In addition, other desirable features and characteristics will become apparent from the subsequent summary and detailed description, and the appended claims, taken in conjunction with the accompanying drawings and this background.

SUMMARY OF EMBODIMENTS

Various non-limiting embodiments of display systems, controllers, and methods of presenting electronic checklists are disclosed herein.

In a first non-limiting embodiment, a display system for an aircraft includes, but is not limited to, a display unit, an input device, and a controller. The controller is communicatively coupled with the display unit and the input device and is configured to retrieve an electronic checklist that includes a plurality of tasks including an annotated task associated with at least one of a note, a warning, a caution, and task information. The controller is further configured to hide from view the at least one of the note, the warning, the caution, and the task information in an image of the electronic checklist based at least in part on viewing criteria. The controller is further configured to generate a signal that causes the display unit to present the image of the electronic checklist.

In a second non-limiting embodiment, a controller includes, but is not limited to, a memory unit and a processor. The memory unit includes stored instructions that when executed on the processor cause the controller to retrieve an electronic checklist from a memory unit. The electronic checklist includes a plurality of tasks, including an annotated task associated with at least one of a note, a warning, a caution, and task information. The instructions further cause the controller to hide from view the at least one of the note, the warning, the caution, and the task information in an image of the electronic checklist based at least in part on viewing criteria. The instructions further cause the controller to generate a signal that causes a display unit to present the image of the electronic checklist.

In a third non-limiting embodiment, a method for presenting an electronic checklist includes, but is not limited to, retrieving, with a controller, an electronic checklist that includes a plurality of tasks including an annotated task associated with at least one of a note, a warning, a caution, and task information. The method further includes hiding from view, with the controller, the at least one of the note, the warning, the caution, and the task information in an image of the electronic checklist based at least in part on viewing criteria. The method yet further includes generating, with the controller, a signal that causes a display unit to present the image of the electronic checklist.

BRIEF DESCRIPTION OF THE DRAWINGS

Advantages of the present embodiments will be readily appreciated as the embodiments becomes better understood by reference to the following detailed description, when considered in connection with the accompanying drawings wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of display systems, controllers, and methods for presenting electronic checklists are provided. In general, the disclosure herein describes dynamic visibility of notes, cautions, warnings, and information (NCWI) associated with tasks of an electronic checklist. More specifically, some embodiments described herein describe hiding from view in an image of the electronic checklist the notes, cautions, warnings, and information when the notes, cautions, warnings, and information are associated with an inactive or non-current task in the electronic checklist. Some embodiments further describe dynamic visibility of conditional branches within the image of the electronic checklist.

In some embodiments, a controller has two modes. In a first of the modes, all NCWI in normal checklists are hidden and NCWI associated with inactive steps of a procedure are hidden. In a second of the modes, NCWI associated with tasks of the normal checklists and the non-normal checklists are shown. Normal checklists are associated with routine operation of an aircraft and non-normal checklists include alternate normal, abnormal, and emergency checklists that are performed in response to an event or selection by the crew, as will be appreciated by those with ordinary skill in the art. A greater understanding may be obtained from reference to the drawings.

Figure 1:
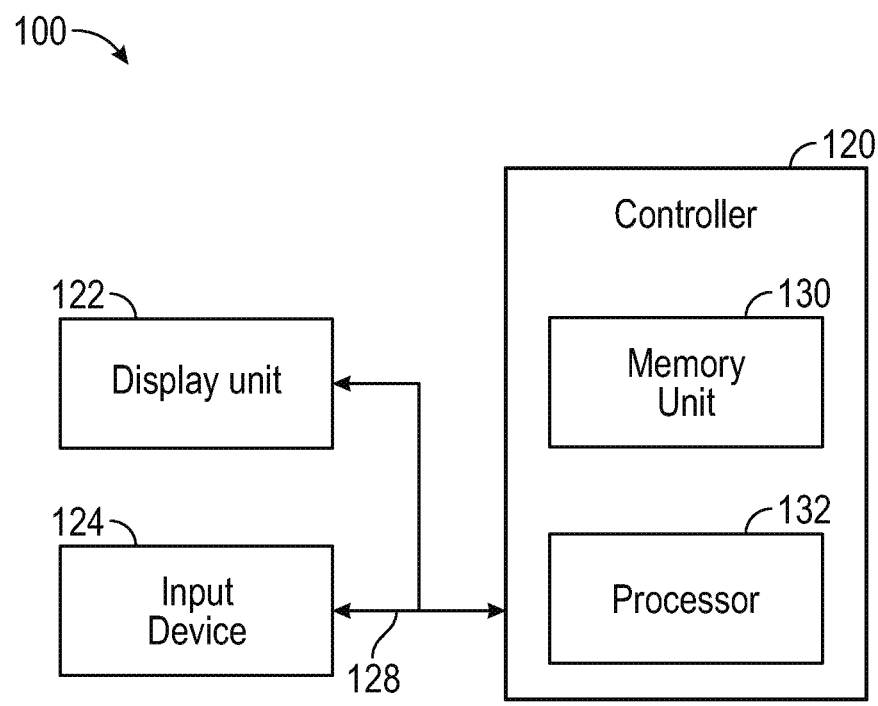
FIG. 1 is a simplified block diagram illustrating a non-limiting embodiment of a display system for an aircraft in accordance with the teachings of the present disclosure.

FIG. 1 is schematic view illustrating a non-limiting embodiment of a display system 100 in accordance with teachings of the present disclosure. In the embodiment provided, display system 100 is an avionics system located in an airplane. In some embodiments, display system 100 is a display system for the nuclear power industry, for the medical industry, or for any other industry or use in which electronic checklists are utilized.

Display system 100 includes a controller 120, a display unit 122, an input device 124, and an interconnect 128. Interconnect 128 communicatively couples controller 120, display unit 122, and input device 124 for electronic communication. In the example provided, interconnect 128 is a communication or network bus, as will be appreciated by those with ordinary skill in the art. It should be appreciated that any suitable network topology or physical medium may be utilized for electronic communication in display system 100. In some embodiments, interconnect 128 is a wireless communications network.

Controller 120 is a hardware device that carries out instructions of a computer program, as is well known to those of ordinary skill in the art. Controller 120 is configured to execute the computer program to provide the functions described in FIG. 2. In some embodiments, controller 120 may be configured to provide the functions of a conventional flight management system (FMS) in addition to performing the operations described in FIG. 2. Controller 120 includes one or more memory units 130 that store electronic data and computer programs. For example, memory units 130 may be flash memory, spin-transfer torque random access memory (STT-RAM), magnetic memory, phase-change memory (PCM), dynamic random access memory (DRAM), or other suitable electronic storage media. In the example provided, memory units 130 store control logic with instructions that cooperate with a processor 132 of controller 120 to perform operations of the method described below. In some embodiments, processor 132 may include one or more central processing units ("CPUs"), a microprocessor, an application specific integrated circuit ("ASIC"), a microcontroller, and/or other suitable device. Furthermore, controller 120 may utilize multiple hardware devices as is also appreciated by those skilled in the art.

Input device 124 receives user inputs from pilots and crew of the airplane. In the example provided, input device 124 is integrated with display unit 122 in a touchscreen device. Display unit 122 is an electronic display that is electronically coupled with controller 120 to visually present information and data in an image according to electronic signals generated by controller 120. For example, display unit 122 may include cathode ray tubes ("CRT"), light-emitting diodes ("LED"), plasma panels, liquid crystal displays ("LCD"), projected images from a Digital Light Processing ("DLP") projector, and/or any other suitable electronic display technology. Although described with reference to a single display unit 122, it should be appreciated that display system 100 may include multiple displays.

In some embodiments, input device 124 and display unit 122 are separate, such as when display unit 122 is a non-touch enabled screen and input device 124 is a cursor control device. Input device 124 may include trackballs, control sticks, or other suitable cursor control devices for the pilot or crew to communicate with controller 120. In some embodiments, input devices 124 may include microphones for voice recognition, or may be integrated with gesture sensors. It should be appreciated that other input devices 124 may be utilized without departing from the scope of the present disclosure.

Figure 2:
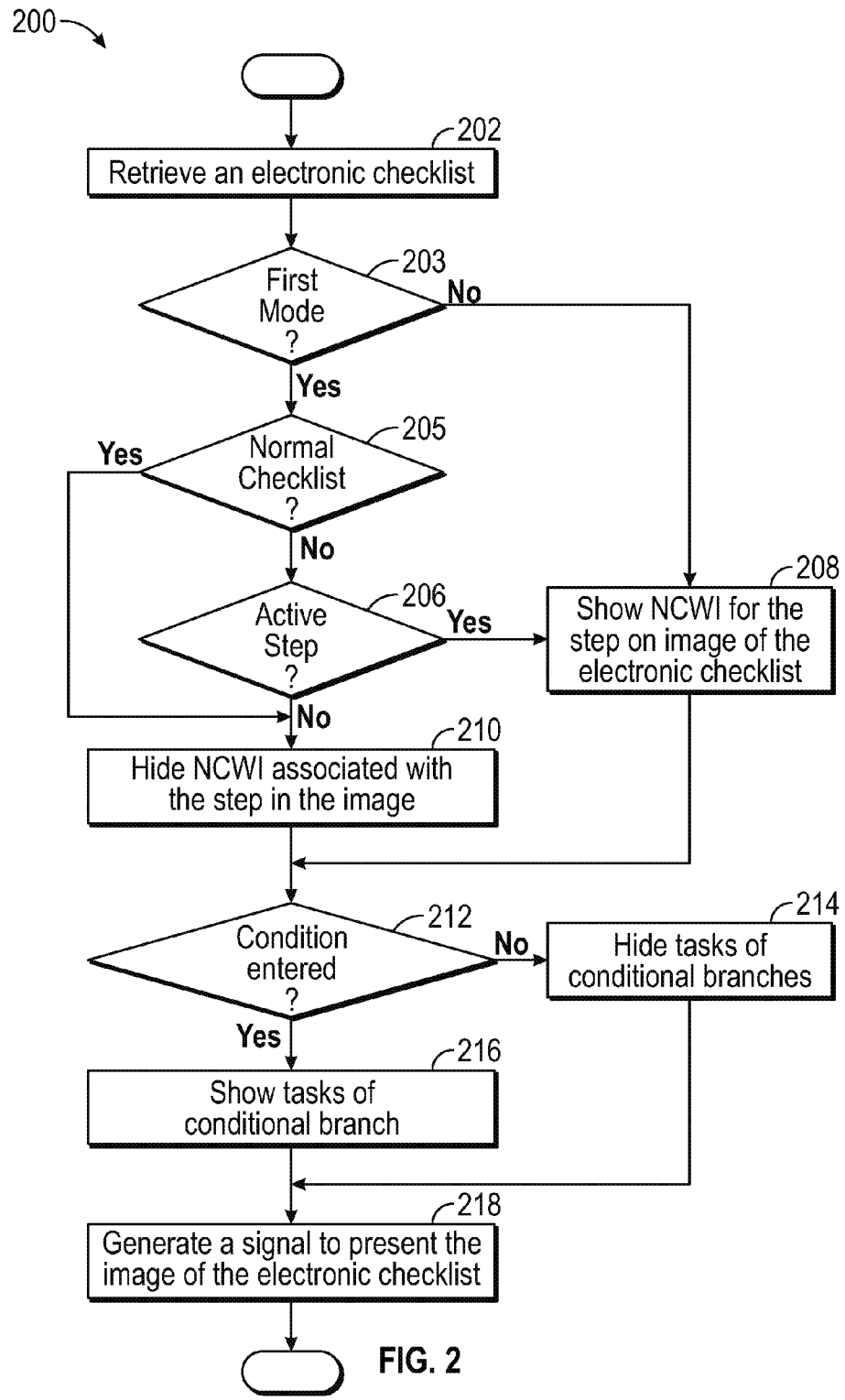
FIG. 2 is a flow diagram illustrating a non-limiting embodiment of a method for presenting an electronic checklist in accordance with the teachings of the present disclosure.

FIG. 2 is a flow diagram illustrating a non-limiting embodiment of a method 200 for presenting an electronic checklist. With continuing reference to FIG. 2, FIGS. 3A-E illustrate images of an electronic checklist 300 for display on display unit 122 in accordance with principles of the present disclosure. In the example provided, operations of method 200 are performed by controller 120. Controller 120 is communicatively coupled with display unit 122 and is configured to generate signals that cause display unit 122 to present the image of electronic checklist 300. For example, controller 120 may include control logic with instructions stored in memory unit 130 and that cooperate with processor 132 to cause controller 120 to perform the algorithm operations of method 200. It should be appreciated that operations of method 200 may alternatively be performed by other controllers or devices.

In general, each task or step of the electronic checklist includes a step number, an item, an associated action, and optionally a Note, Caution, Warning, or Information (NCWI). In the example provided, NCWI are hidden based on viewing criteria that includes that mode of the controller, the type of checklist, and whether the task or step is an active step in the procedure. When a step is the Current step and the electronic checklist is a non-normal checklist, any NCWI associated with that step are automatically expanded to make visible the NCWI, as will be described below. The NCWI for steps that are not the Current step are hidden when the controller is in a first mode. In some embodiments, the user can view the NCWI on a specific step by selecting the NCWI icon on that step, or by using the global NCWI display button in the upper right which will cause all NCWI in the procedure to display by changing the mode of the controller to the second checklist presentation mode.

The various operations of method 200 describe how controller may manipulate visible portions of the image of electronic checklist 300, such as by making visible or hiding certain portions of electronic checklist 300. For example, such manipulation may be implemented by manipulating pixels in an electronic image or by manipulating instructions for other controllers or devices to manipulate pixels in an electronic image. It should be appreciated that the manipulation may be accomplished by performing any other suitable operations that enable display unit 122 to ultimately present an image of the manipulated electronic checklist without departing from the scope of the present disclosure, as will be appreciated by those with ordinary skill in the art.

Controller 120 retrieves an electronic checklist in operation 202. For example, controller 120 may retrieve electronic checklist 300 from memory unit 130. As illustrated in FIGS. 3A-D, electronic checklist 300 includes first through seventh tasks 310, 312, 314, 316, 318, 320, 322 and a row of conditions 330 for conditional branches of electronic checklist 300. Tasks 310, 314, 320, 322 are annotated tasks associated with at least one of a note, a warning, a caution, and task information. For example, first task 310 is associated with a warning that all smoke and/or fumes should be considered toxic and is associated with a warning that finding the source of the smoke should not delay descent or diversion.

In the example provided, electronic checklist 300 is an "Airplane Interior Fire/Smoke/Fumes" abnormal checklist and the tasks are performed to remedy the abnormal condition, as will be appreciated by those with ordinary skill in the art. It should be appreciated that the number of tasks, the number of tasks with annotations, the type of checklist, the presence of conditional branches, the type of annotations, and the number of conditional branches may vary in any particular implementation without departing from the scope of the present disclosure.

Controller 120 determines whether controller 120 is in a first checklist presentation mode in operation 203. In the example provided, a mode selector button 338 indicates the current mode of controller 120. For example, FIGS. 3A-C and 3D illustrate electronic checklist 300 in the first checklist presentation mode. When controller 120 is in the first checklist presentation mode, method 200 proceeds to operation 205. When controller 120 is not in the first checklist presentation mode, method 200 proceeds to operation 208. In the example provided, the mode of controller 120 may be toggled between the first checklist presentation mode and the second checklist presentation mode by pressing mode selector button 338. Controller 120 determines whether the electronic checklist is a normal checklist in operation 205. For example, the checklist is a normal checklist when the checklist is a checklist for routine operations (engine start, begin descent, etc.), as will be appreciated by those with ordinary skill in the art. In contrast, non-normal checklists, such as alternate normal, abnormal, and emergency checklists may be associated with crew alternate selections, conditions of the aircraft, or other non-routine events or conditions, as will be appreciated by those with ordinary skill in the art. When the electronic checklist is a normal checklist, method 200 proceeds to operation 210. When the electronic checklist is not a normal checklist, method 200 proceeds to operation 207.

Figure 3A:
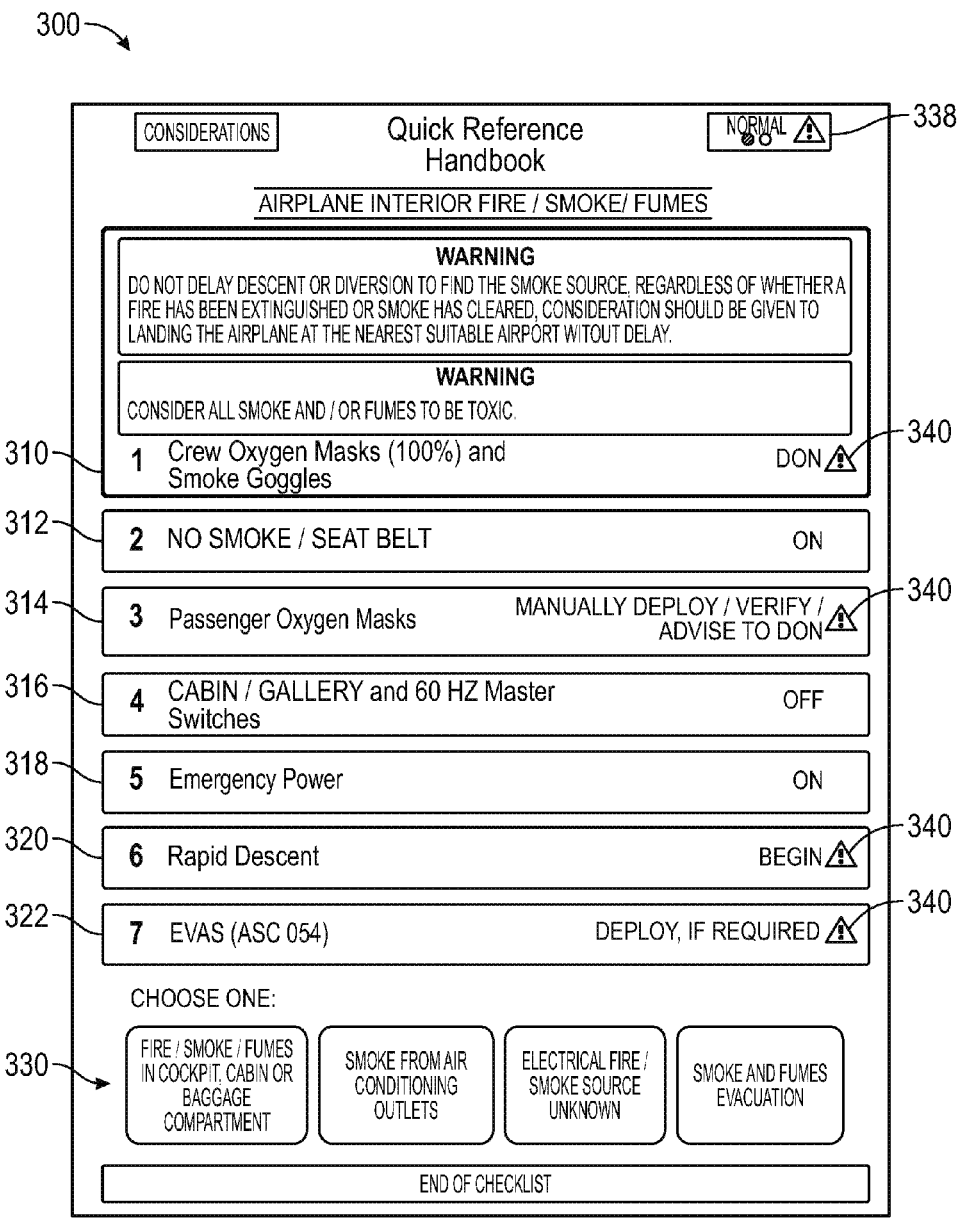
FIGS. 3A, 3B, 3C, 3D, and 3E illustrate non-limiting embodiments of electronic checklists in various states in accordance with the teachings of the present disclosure.
Figure 3B:
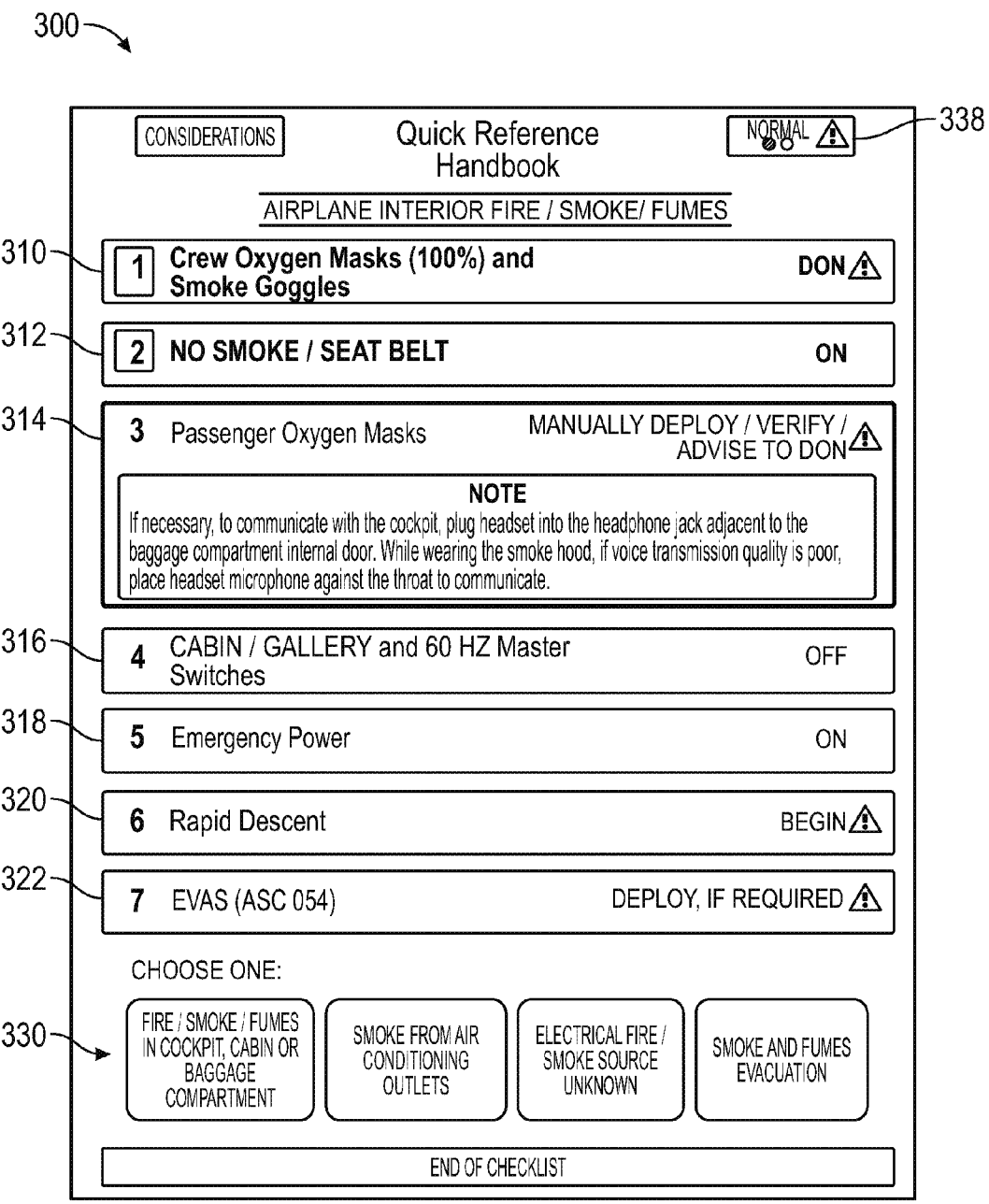
Figure 3C:
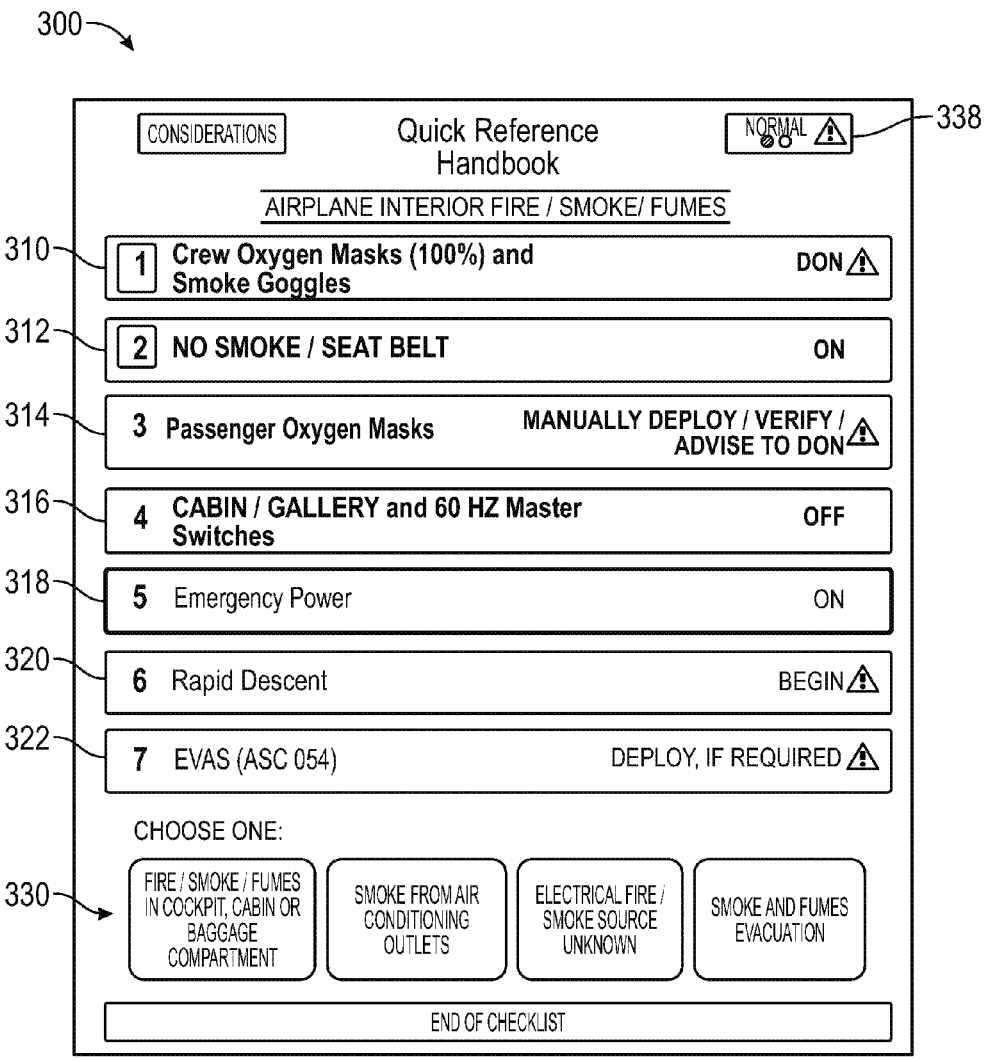
Figure 3D:
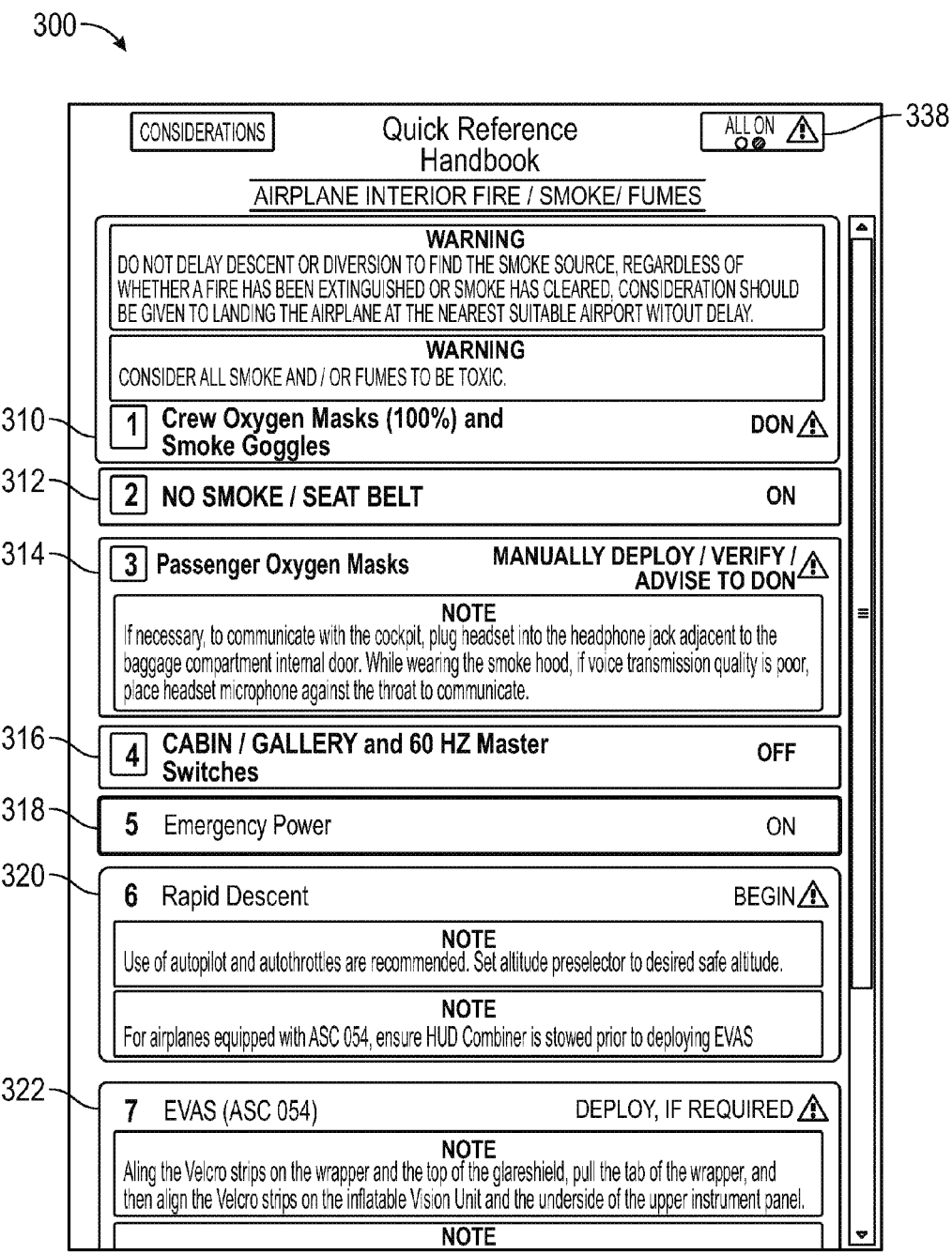
Figure 3E:
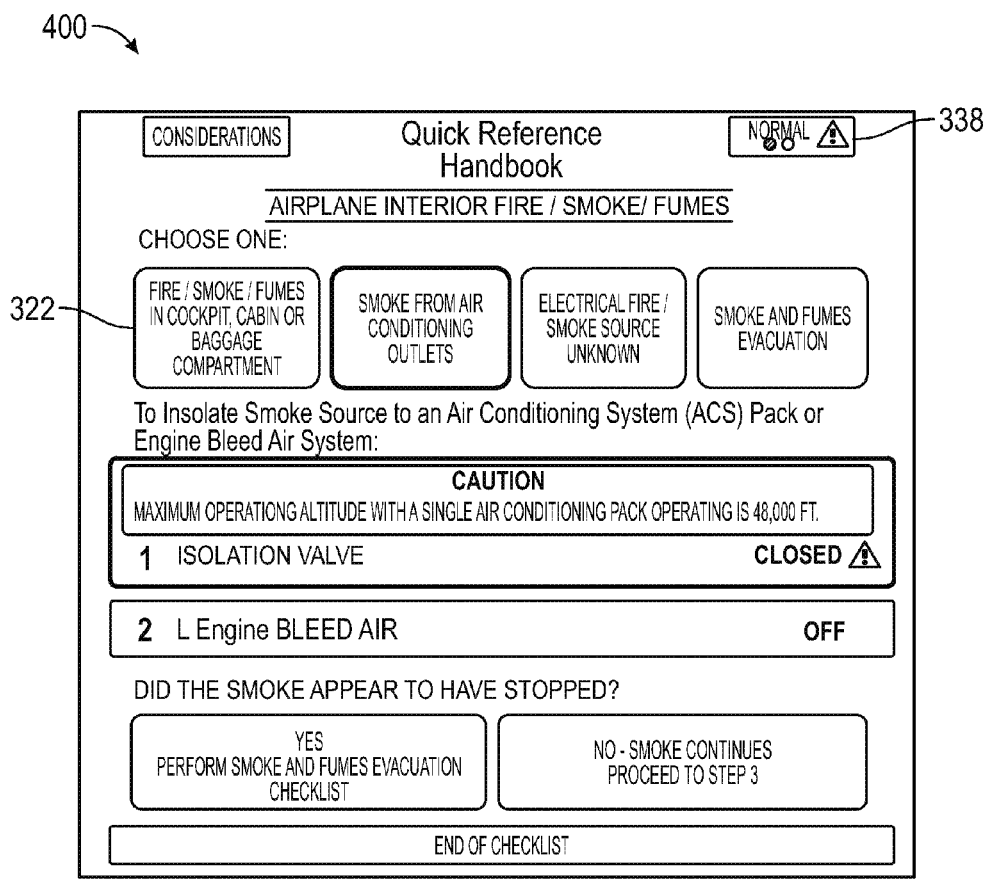

Controller 120 determines whether each task of the electronic checklist is an active step in operation 207. The active step is the step the pilot is prompted to perform at any given point in the checklist. In the example provided, only one task may be the active step at each point in time. Controller 120 may indicate which task is the active task with a visual cue, such as a thickened color border surrounding the active step. FIG. 3A illustrates electronic checklist 300 with first task 310 as the active step, FIG. 3B illustrates electronic checklist 300 with third task 314 as the active step, and FIGS. 3C-D illustrate electronic checklist 300 with other active steps. When the task is an active step, method 200 proceeds to operation 208. When the step is not an active step, method 200 proceeds to operation 210.

Controller 120 shows notes, cautions, warnings, and task information (NCWI) associated with the task in operation 208. The controller presents the at least one of the note, the warning, the caution, and the task information in the image of the electronic checklist based at least in part on the annotated task being an active task in the electronic checklist. The controller further permits presentation of the at least one of the note, the warning, the caution, and the task information based entirely on the controller being in a second checklist presentation mode. For example, FIG. 3D illustrates electronic checklist 300 in a second checklist presentation mode where all notes, cautions, warnings, and task information are displayed for inactive steps as well as the active step. Accordingly, pilots and crew may place controller 120 in the second checklist presentation mode when learning or studying a checklist procedure where it may be desirable to see all NCWI associated with the checklist. In the example provided, NCWI are associated with tasks by the originator of the checklists (e.g., the aircraft manufacturer), and may not be manipulated or deleted by the crew. In some embodiments, the content of NCWI may be manipulated by users or maintenance personnel.

Controller 120 hides notes, cautions, warnings, and task information (NCWI) associated with the step in operation 210. Controller 120 hides from view the at least one of the note, the warning, the caution, and the task information in the electronic checklist based at least in part on the annotated task being an inactive task in the electronic checklist. The controller hides from view the at least one of the note, the warning, the caution, and the task information further based on the controller being in the first checklist presentation mode.

Controller 120 determines whether a condition for a conditional branch has been entered in operation 212. Electronic checklist 300 may include conditional branches that are only performed when certain conditions are present, as will be appreciated by those with ordinary skill in the art. In the example provided, the condition may be entered by the crew or may be detected by sensors onboard the aircraft and automatically entered. When no condition has been entered, method 200 proceeds to operation 214 to hide tasks of the conditional branches. When a condition has been entered, method 200 proceeds to operation 216 to show tasks of the conditional branch, such as tasks illustrated in conditional branch 400 of FIG. 3E. Accordingly, the controller is configured to present on the electronic checklist conditions associated with a conditional checklist, and to hide from view on the electronic checklist a condition task associated with the conditional checklist until the conditional checklist is indicated as an active branch. Accordingly, visual clutter and ease of use is improved over conventional electronic checklists that display each task of every conditional branch.

Controller 120 generates a signal to present a visual image of the electronic checklist in operation 218. For example, electronic checklist 300 of any of FIGS. 3A-E may be displayed on display unit 122 in response to generation of a signal by controller 120.

In the example provided, controller 120 is further configured to present an indicator 340 associated with the annotated task. Indicator 340 indicates which of the note, the warning, the caution, and the task information is associated with the annotated task. In the example provided, if a step has NCWI associated with it, the step will have a triangle on the far right with a bold exclamation mark within it. The NCWI symbol is color coded to reflect the highest level of NCWI on the step, red for a Warning, amber for a Caution, and white for a Note or Information. Controller 120 presents the indicator when the annotated task is the inactive task, as well as when the annotated task is the active task. In the example provided, the indicator is color coded to indicate the type of annotation associated with each annotated task.

In some embodiments, the controller is further configured to present the indicator associated with the note, the caution, the warning, and the task information having a highest priority. For example, when a task has both a warning and a caution, the indicator may be red to indicate that the task has a warning annotation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for an aircraft, the display system comprising:
   a display unit;
   an input device; and a controller communicatively coupled with the display unit and the input device, the controller having a first checklist presentation mode and a second checklist presentation mode, the controller configured to:
- retrieve an electronic checklist that includes a plurality of tasks including an annotated task associated with at least one of a note, a caution, a warning, and task information (NCWI);
- hide from view the at least one of the NCWI of the annotated task in an image of the electronic checklist based on viewing criteria when the controller is in the first checklist presentation mode;
- show in the electronic checklist the NCWI for each of the plurality of tasks that is associated with the NCWI regardless of which of the plurality of tasks is an active task when the controller is in the second checklist presentation mode; and
- generate a signal that causes the display unit to visually present the image.

2. The display system of claim 1, wherein the viewing criteria includes the annotated task being an inactive task in the electronic checklist.

3. The display system of claim 1, wherein the viewing criteria includes the electronic checklist being a normal checklist.

4. The display system of claim 1, wherein the controller is further configured to control the display unit to present the at least one of the (NCWI) in the electronic checklist based at least in part on the annotated task being the active task in the electronic checklist when the controller is in the first checklist presentation mode.

5. The display system of claim 1, wherein the controller is further configured to control the display unit to present on the electronic checklist a condition associated with a conditional checklist, and wherein the controller is further configured to control the display unit to hide from view on the electronic checklist a condition task associated with the conditional checklist until the conditional checklist is indicated as an active branch.

6. The display system of claim 1, wherein the controller is further configured to control the display unit to present an indicator associated with the annotated task and indicating which of the NCWI is associated with the annotated task.

7. The display system of claim 6, wherein the controller is further configured to control the display unit to present the indicator when the annotated task is an inactive task.

8. A controller comprising:
a memory unit; and
a processor,
wherein the memory unit includes stored instructions that when executed on the processor cause the controller to have a first checklist presentation mode, to have a second checklist presentation mode, and to:
- retrieve an electronic checklist from the memory unit, the electronic checklist including a plurality of tasks including an annotated task associated with at least one of a note, a caution, a warning, and task information (NCWI);
- hide from view the at least one of the NCWI of the annotated task in an image of the electronic checklist based on viewing criteria when the controller is in the first checklist presentation mode;
- show in the electronic checklist the NCWI for each of the plurality of tasks that is associated with the NCWI regardless of which of the plurality of tasks is an active task when the controller is in the second checklist presentation mode; and
- generate a signal that causes a display unit to present the image of the electronic checklist.

9. The controller of claim 8, further configured to make visible the NCWI in the image of the electronic checklist based at least in part on the annotated task being an active task in the electronic checklist and on the electronic checklist being a non-normal checklist.

10. The controller of claim 8, wherein the viewing criteria includes the annotated task being an inactive task in the electronic checklist.

11. The controller of claim 8, further configured to make visible in the image of the electronic checklist at least one condition associated with a conditional checklist, and wherein the controller is further configured to hide from view on the electronic checklist a condition task associated with the conditional checklist until the conditional checklist is indicated as an active branch.

12. The controller of claim 8, further configured to make visible in the image an indicator associated with the annotated task and indicating which of the NCWI is associated with the annotated task.

13. The controller of claim 12, further configured to make visible the indicator in the image when the annotated task is an inactive task.

14. The controller of claim 12, further configured to make visible in the image the indicator associated with the NCWI having a highest priority.

15. A method of presenting an electronic checklist, the method comprising:
- retrieving, with a controller, the electronic checklist that includes a plurality of tasks including an annotated task associated with at least one of a note, a caution, a warning, and task information (NCWI);
- hiding from view, with the controller, the at least one of the NCWI of the annotated task in an image of the electronic checklist based on viewing criteria when the controller is in a first checklist presentation mode;
- showing in the electronic checklist the NCWI for each of the plurality of tasks that is associated with the NCWI regardless of which of the plurality of tasks is an active task when the controller is in a second checklist presentation mode; and
- generating, with the controller, a signal that causes a display unit to present the image of the electronic checklist.

16. The method of claim 15, further comprising making visible the NCWI in the image of the electronic checklist when the controller is in the first checklist presentation mode based at least in part on the annotated task being an active task in the electronic checklist.

17. The method of claim 15, further comprising making visible in the image of the electronic checklist conditions associated with a conditional checklist, the method further comprising hiding from view on the image of the electronic checklist a condition task associated with the conditional checklist until the conditional checklist is indicated as an active branch.

* * * * *